United States Patent [19]

Abbenante

[11] 3,835,455

[45] Sept. 10, 1974

[54] SYSTEM FOR SIMULTANEOUSLY DISPLAYING REPRESENTATION OF A PLURALITY OF WAVEFORMS IN TIME OCCURRING RELATION

[75] Inventor: Thomas J. Abbenante, Branford, Conn.

[73] Assignee: Corometrics Medical Systems, Inc., Wallingford, Conn.

[22] Filed: Aug. 20, 1971

[21] Appl. No.: 173,686

Related U.S. Application Data

[63] Continuation of Ser. No. 848,652, Aug. 8, 1969, abandoned.

[52] U.S. Cl. .......... 340/172.5

[51] Int. Cl. .......... G06f 3/14

[58] Field of Search .......... 340/172.5, 324 A, 324 AD

[56] References Cited

UNITED STATES PATENTS

| | | | |
|---|---|---|---|
| 2,978,680 | 4/1961 | Schulte, Jr. | 340/172.5 |
| 3,333,247 | 7/1967 | Hadley et al. | 340/172.5 |
| 3,366,933 | 1/1968 | Carp et al. | 340/172.5 |
| 3,374,461 | 3/1968 | Anderholm et al. | 340/172.5 |
| 3,406,387 | 10/1968 | Werme | 340/172.5 X |
| 3,497,613 | 2/1970 | Botjer et al. | 340/172.5 |
| 3,505,650 | 4/1970 | Brown, Jr. | 340/172.5 |
| 3,581,290 | 5/1971 | Sugerman | 340/172.5 |

*Primary Examiner*—Harvey E. Springborn
*Attorney, Agent, or Firm*—Delio and Montgomery

[57] ABSTRACT

This disclosure relates to a system for monitoring and storing the amplitude of a plurality of simultaneously occurring waveforms and simultaneously displaying the history of the waveforms over a predetermined interval of time. The amplitudes of the waveforms are sampled at closely spaced intervals of time and stored in a multi-station memory system. Periodically each stored waveform is updated and the oldest sampled and stored amplitude discarded.

14 Claims, 15 Drawing Figures

PATENTED SEP 10 1974 3,835,455

SHEET 01 OF 12

INVENTOR

Thomas J. Abbenante

BY De Lio and Montgomery

ATTORNEYS

INVENTOR
Thomas J. Abbenante
BY
DeLio and Montgomery
ATTORNEYS

INVENTOR
Thomas J. Abbenante

BY Dezio and Montgomery
ATTORNEYS

INVENTOR
Thomas J. Abbenante

BY Dodo and Montgomery
ATTORNEYS

| CHANNEL | $2^{10}$ | $2^{11}$ | $2^{12}$ | WORD |
|---|---|---|---|---|
| 1 | 0 | 0 | 0 | 0 -1023 |
| 2 | 1 | 0 | 0 | 1024-2047 |
| 3 | 0 | 1 | 0 | 2048-3071 |
| 4 | 1 | 1 | 0 | 3072-4095 |
| 5 | 0 | 0 | 1 | 4096-5119 |
| 6 | 1 | 0 | 1 | 5120-6143 |
| 7 | 0 | 1 | 1 | 6144-7176 |
| 8 | 1 | 1 | 1 | 7168-8191 |

INVENTOR

Thomas J. Abbenante

BY Dealo and Montgomery
ATTORNEYS

INVENTOR

Thomas J. Abbenante

BY Dedio and Montgomery
ATTORNEYS

INVENTOR
Thomas J. Abbenante

BY De Lio and Montgomery
ATTORNEYS

INVENTOR
Thomas J. Abbenante
BY
DeLio and Montgomery
ATTORNEYS

PATENTED SEP 10 1974 3,835,455

SHEET 10 OF 12

INVENTOR

Thomas J. Abbenante

BY DeLio and Montgomery
ATTORNEYS

INVENTOR

Thomas J. Abbenante

BY

DeLio and Montgomery

ATTORNEYS

INVENTOR
Thomas J Abbenante
BY
De Lio and Montgomery
ATTORNEYS

SYSTEM FOR SIMULTANEOUSLY DISPLAYING REPRESENTATION OF A PLURALITY OF WAVEFORMS IN TIME OCCURRING RELATION

This application is a continuation of copending application Ser. No. 848,652 filed Aug. 8, 1969, now abandoned.

This invention relates to monitoring systems, and more particularly relates to monitoring systems adapted to monitor and display on-line signals together with the history of such signals over a predetermined period of time.

This invention provides a monitoring system adapted to simultaneously display a plurality of reoccuring signals for presentation at a central location in order that one person may monitor conditions occurring at a plurality of remote points. This invention is particularly adaptable for use in conjunction with fetal heart rate monitoring systems disclosed in copending application Ser. No. 726,428 filed May 3, 1968, now U.S. Pat. No. 3,599,628, which is assigned to the same assignee as this application.

The referenced copending application discloses a system for detecting fetal heartrate simultaneously with intra-uterine pressure to indicate if there is any fetal distress during labor. Such systems which are available from Corometrics Medical Systems, Inc. of North Haven, Connecticut, and designated as FMS-101, are utilized in hospital labor rooms to detect any fetal distress. In many instances, there may be several prospective mothers in labor where fetal heartrate and intra-uterine pressure are being detected and monitored to safeguard the fetus.

The system embodying the present invention is arranged to display the fetal heartrate and intra-uterine pressure from a plurality of labor rooms simultaneously on one display means in order that one person may monitor a plurality of simultaneous fetal activities.

The present invention is further arranged to store for a predetermined period the history of a plurality of waveforms and simultaneously display such waveforms and the history thereof for a predetermined period of time. This is achieved in one form of the invention by providing a memory system adapted to store in digital form the waveforms defined by a plurality of analog voltage values and upon command to utilize the stored voltage values to define corresponding waveforms which are utilized to control the sweep of a cathode ray tube. The invention further provides new and improved time-sharing means so that a plurality of channels of information may be defined in the memory system, and may be utilized to provide in conjunction with the vertical deflection of the cathode ray tube a plurality of simultaneous waveforms corresponding to the on-line information on a plurality of lines together with the history of each of said waveforms. In this manner, waveforms may be shown which have occurred over a past predetermined interval of time.

The present invention further provides new and improved means for constantly updating the waveforms stored in the memory.

This is achieved by sequentially sampling the amplitudes of a plurality of waveforms in very close intervals of time, converting the analog value of the waveforms to a digital representation, storing the digital representation in a given channel and address in a memory system corresponding to each waveform, shifting the stored indications of the envelope periodically as on-line information is read and discarding the oldest envelope indication and utilizing the stored waveform envelopes to produce an essentially simultaneous representation of all of the monitored waveforms and the histories thereof.

Accordingly, it is an object of this invention to provide a new and improved central monitoring system for monitoring a plurality of waveforms and the histories thereof over a predetermined period of time.

Another object of this invention is to provide a monitoring system having new and improved means for simultaneously displaying a plurality of on-line waveforms and the histories thereof over a predetermined period of time.

Another object of this invention is to provide a new and improved memory system together with peripheral controls for storing a plurality of waveforms and upon command writing or displaying such envelopes, and further constantly updating such envelopes to take on-line information.

The features of the invention which are believed to be novel are particularly set forth and distinctly claimed in the concluding portion of the specification. The invention, however, both as to its organization and operation, together with further objects and advantages thereof may best be appreciated by reference to the following detailed description taken in conjunction with the drawings, wherein:

FIG. 1 is a block diagram of a system embodying the invention;

FIG. 1*a* is a diagram of two simultaneously occurring waveforms;

FIG. 2 is a schematic diagram of the control logic of the system of FIG. 1;

FIGS. 3*a* and 3*b* exemplify waveforms generated by the network of FIG. 2;

FIG. 4 is a diagram partly schematic and partly in block form of the sampling network of FIG. 1;

FIG. 4*a* is a diagram of the logical conditions which indicate to the system which of a plurality of waveforms is being operated upon;

Figure 1:
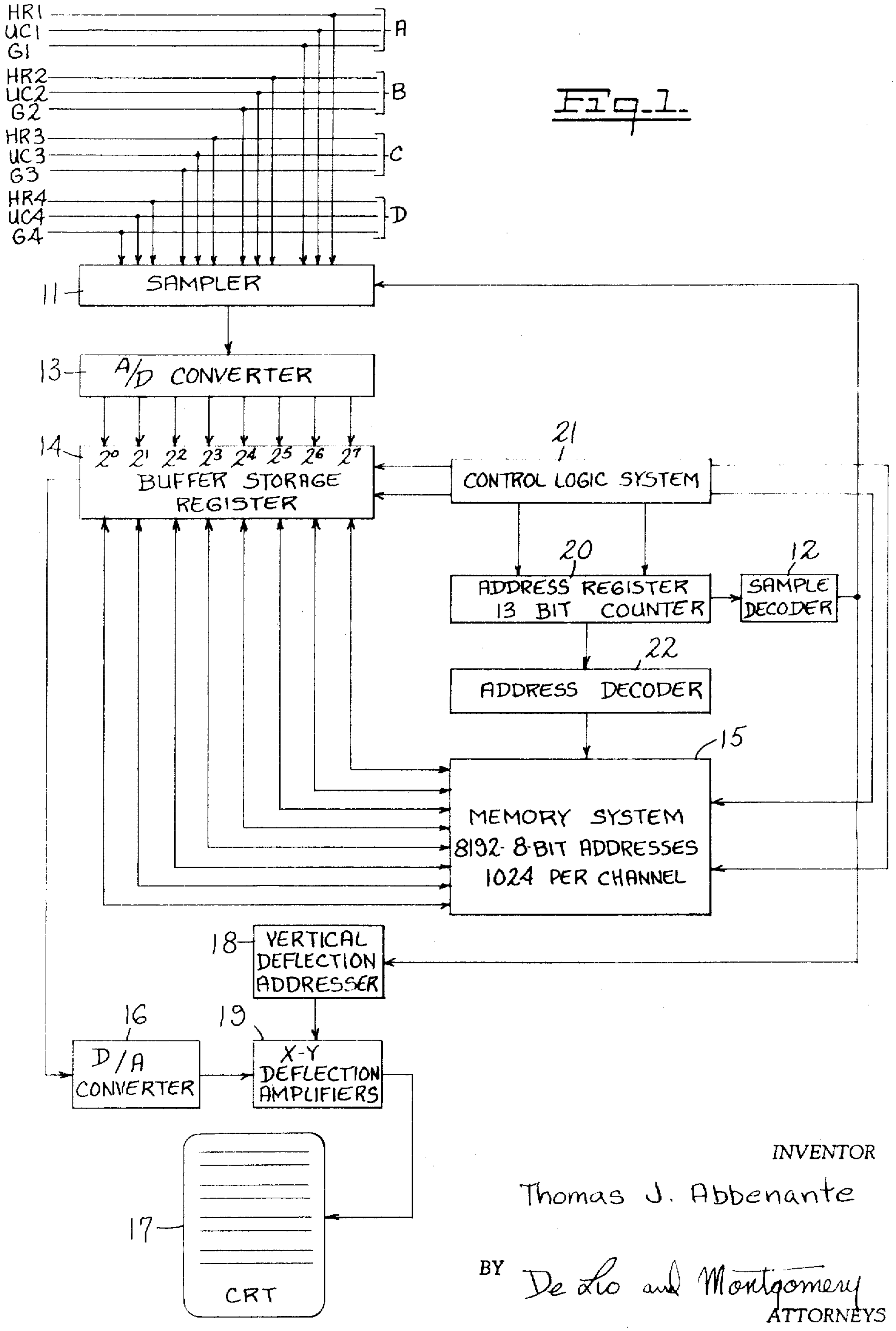

A system 10 embodying the invention is shown in logical block form in FIG. 1 and generally comprises a multiplexer or sampler 11 adapted to receive a plurality of signals designated as HR1-HR4, UC1-UC4, and G1-G4. The on-line signals are applied to the sampler and sequentially sampled as hereinafter described.

Figure 1A:
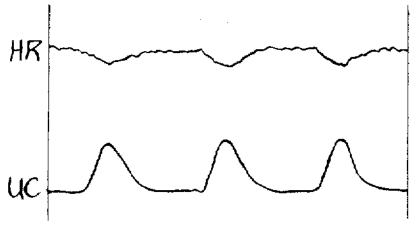

Each of the channels A, B, C and D represents the lines from a fetal heartrate monitor as disclosed in co-pending application Ser. No. 726,428 filed May 3, 1968, now U.S. Pat. No. 3,599,628. The HR lines indicate the heartrate signal, the UC lines indicate the uterine pressure signal and the G lines are common or ground lines. One set of simultaneously occurring signals is shown in FIG. 1*a*. These signals are simultaneously occurring and derived from one patient. Correlation of the change in the HR signal with the UC signal provides information relative to a fetus, as described in the aforementioned patent. Each of the channels may come from a different labor room. However, it is to be understood that the on-line information which is sampled by the system is not limited to the particular type of data mentioned. As shown, there are eight information lines and four common or ground lines. The information which is sampled is the instantaneous amplitude of a waveform and is an analog value. The sampler 11 is under the control of a sample decoder 12 which detects the channel in a memory system in which the incoming information is to be applied. Accordingly, a sample decoder 12 will sequentially pass an analog voltage from lines HR1, UC1, HR2, UC2, HR3, UC3, HR4, UC4 referred to associated grounds to an analog-to-digital converter 13. The analog magnitude of the instantaneous waveform detected is converted into an eight-bit digital representation and upon command applied to an eight-bit buffer storage register 14.

The voltage value stored digitally in buffer storage register 14 will be transferred to the first address of the appropriate channel of memory system 15. Memory system 15 comprises by way of example serially arranged addresses or digital word storage stations which, for purposes of discussion will be considered to be 8192 in number.

These addresses are classified into eight channels of 1024 words or addresses each, the channels corresponding in number to the number of on-line intelligence signals. Each address comprises an eight bit storage register corresponding in bits to buffer storage register 14. The addresses will be considered to be serially numbered. Each address, therefore, may be considered as a numerical word which represents in digital form the instantaneous value of one of the on-line signals. Each address or storage station will be denoted by a prefix M followed by a number (M0000–M8191). The instantaneous voltage on each line is sampled, converted to a digital representation and stored in buffer storage register 14. It is then transferred to the appropriate address in memory system 15. Every predetermined interval of time, for example one second, the information in memory system 15 is updated for all incoming signals and the oldest pieces of intelligence in each channel is discarded.

During the intervals between which the on-line information is sample, the waveforms stored in memory system 15 are read out through buffer storage register 14 to a digital-to-analog converter 16. The analog converted voltage is then utilized to modulate the sweep of a cathode ray tube to display the stored voltage envelope. As will hereinafter be described, eight traces are simultaneously displayed on cathode ray tube 17 which has a long persistency displayed. Simultaneously with the application of the converted analog voltage to the cathode ray tube, a signal is derived from sample decoder 12 indicative of the channel from which information is being read out, and is utilized to control the vertical deflection addresser 18 of the cathode ray tube. The deflection amplifiers 19 utilize the vertical position address signals and the converted analog voltages to show each monitored signal on the display in its predetermined location. In this manner, eight traces may be simultaneously displayed. A suitable cathode ray tube is a model KM02 produced by the Industrial Products Division of International Telephone and Telegraph Corp. San Fernando, California.

As will hereinafter be described, the system may be arranged to display all eight traces thirty times per second. Each display of all the information in memory system 15, that is, all eight channels, will be considered to be a display frame. Therefore, thirty frames are displayed each second.

The particular address in memory system 15 to be addressed or operated upon is selected through an address register 20 which comprises a thirteen bit binary counter. Register 20 receives a series of advance pulses from the control logic system 21. These pulses may be incrementing or decrementing as hereinafter described. The count in register 20 is decoded by an address decoder 22 which selects the address called for by address register 20.

The operation of the entire system is under the control of control logic system 21. Control logic system 21 provides a plurality of different command and timing signals which are hereinafter explained in conjunction with FIGS. 2 and 3. To insure a clear explanation, numerical times may be considered for purposes of example in order to best explain basic relationships. Let it be assumed that the time of address of each word in memory system 15 is four microseconds and the time for all addresses is .032768 seconds or 327 milliseconds. With this time for addressing all words, thirty frames per second may be displayed. As previously mentioned each frame comprises a display of eight traces once or 8192 words serially.

The system must then be updated after a predetermined number of frames. Assume, for example, that the memory system is updated after every twenty frames. The display of information is continued while the information in each of the eight channels is shifted serially to the next numerical word and each of the eight intelligence signals is sampled.

Figure 2:
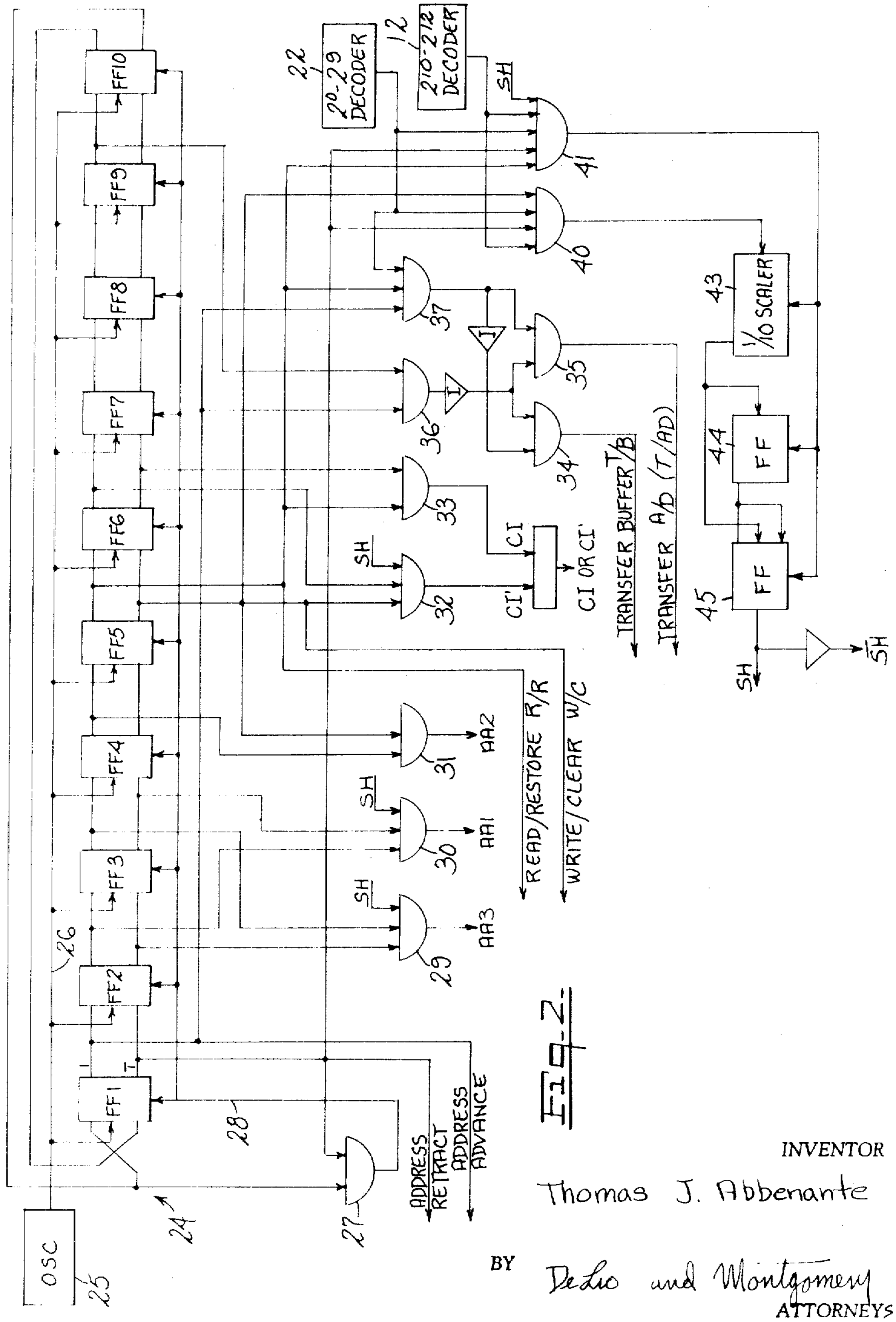
Figure 3A:
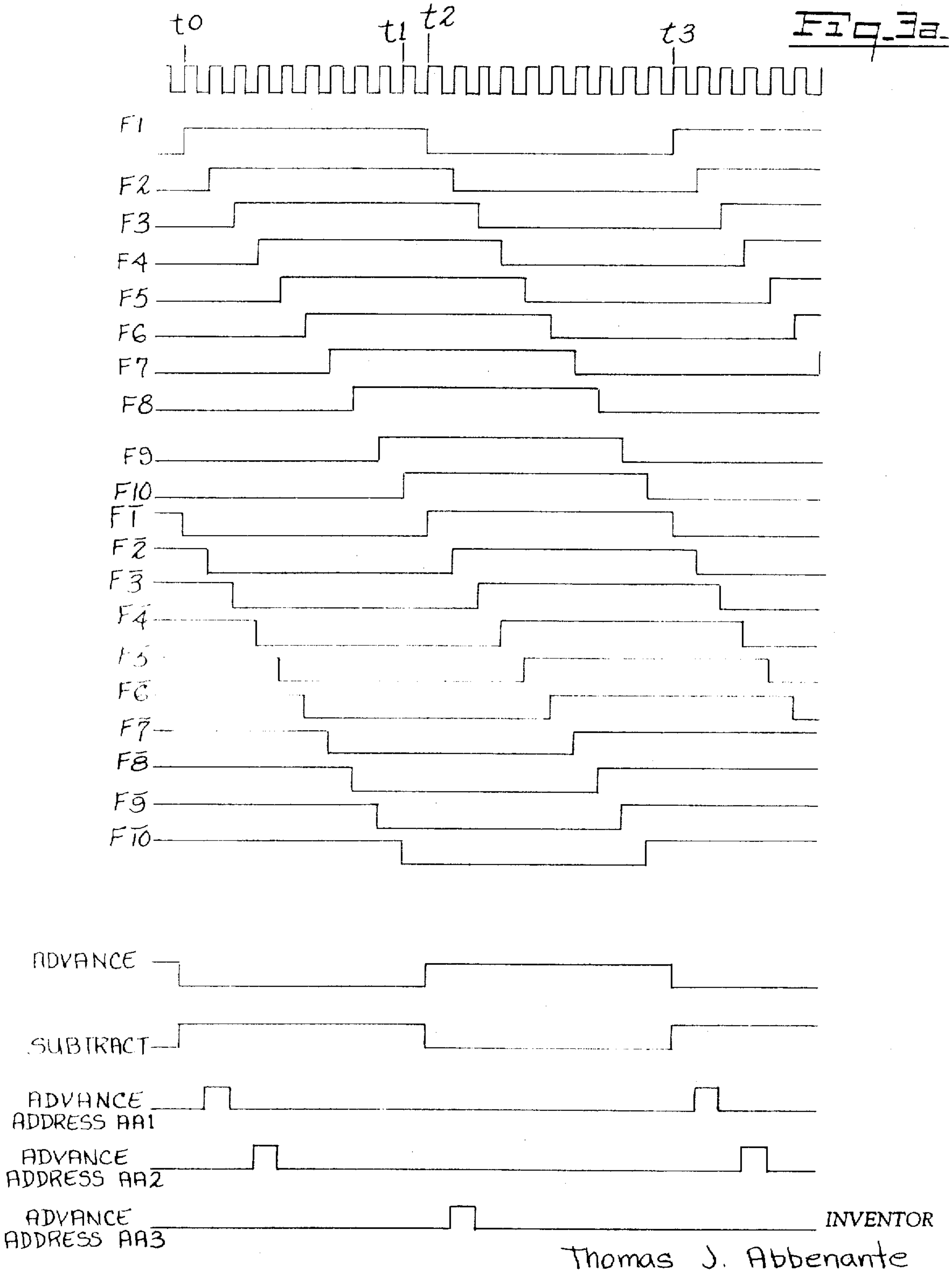
Figure 3B:
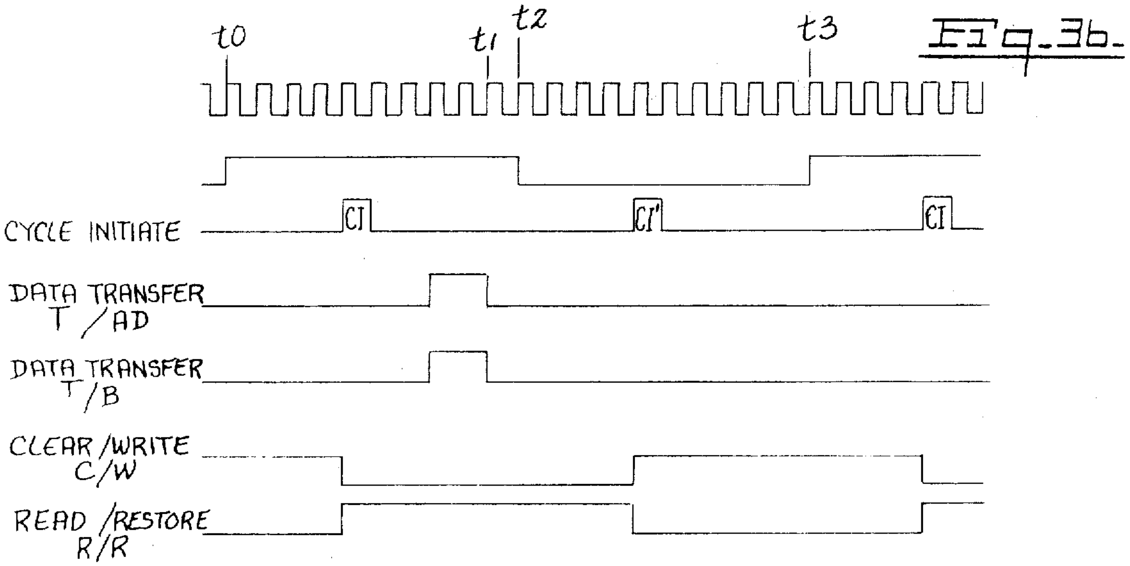

Reference is now made to FIG. 2 which illustrates control logic 21, in conjunction with the waveforms set forth in FIGS. 3*a* and 3*b*. The logic control 21 basically comprises a ten position shift register 24 comprising a plurality of flip-flops FF1 – FF10. The shift register 24 receives signals from a master oscillator 25. Each of the flip-flops FF1 – FF10 have a true and false output line which are exemplified by 1 and $\overline{1}$ at flip-flop FF1. The oscillator supplies rectangular wave pulses at a high frequency, for example, five megacycles, over line 26. The operation of the shift register will be understood by one skilled in the art merely from inspection thereof. The flip-flops are in a non-carry arrangement and the pulses from oscillator 25 act as shift pulses. Briefly stated, assume that all of the flip-flops are in a false condition. Gate 27 senses that neither FF1 nor FF10 is in a true condition which will indicate that all of the flip-flops are in a false condition. Gate 27 will then apply a signal over line 28 to all of the flip-flops. Now, if operation of oscillator 25 is initiated, the first pulse of a master clock pulse train MC as shown in FIG. 3 will set FF1. This will now change the condition of the output of gate 27 and as succeeding MC pulses are applied to line 26, the first bit in FF1 will be successively shifted through the chain and successive bits will be applied to the chain of flip-flops. Thus, once a flip-flop is set in a true condition it will remain in a true condition (or not true) condition for a series of ten MC pulses. When all ten flip-flops are set in a true condition, that is, the upper line output of each flip-flop indicates a set condition, such condition is sensed by gate 27 which applies a signal indicative thereof over line 28 to each of flip-flops FF1 - FF10. Then when the next MC pulse is received at time T2, FF1 will be set such that a false condition or $\bar{1}$ is exemplified on its upper output line. Successive MC pulses will then shift this condition throughout the change of flip-flops and the voltage waveforms designated F1 - F10 and $\bar{F1}$ - $\bar{F10}$ will appear as shown in FIG. 3*a*. The time of one cycle of operation from $t_0$ to $t_3$ as exemplified is four microseconds.

A plurality of timing and control signals in a predetermined sequence may be derived from the shift register 24. Referring to FIG. 3*a*, the time intervals for address advance and address retract are derived from the two outputs of FF1. The address advance signals AA1, AA2, AA3 are derived from gates 29, 30 and 31. The cycle initiate CI signal is derived from gates 32 and 33. Read/restore (R/R) and write/clear (W/C) signals are derived from the outputs of flip-flop FF5. As will hereinafter be more fully explained, two transfer signals are utilized. One signal T/B is to transfer a numerical word, from the memory system to the buffer register during a display operation. The other transfer signal T/AD is utilized to transfer a numerical word from analog-to-digital converter 13 to an address in the storage system. These signals are derived from gates 34 and 35 through gates 36 and 37. Gate 34 supplies a signal during a time when both flip-flops FF1 and FF9 are in a true condition and when flip-flops FF1 and FF5 are also in a true condition. The outputs of gates 36 and 37 are both inverted by inverters 38 and 39, respectively, prior to application of signals to gate 34. The T/AD signal occurs only when all of the bits in the first ten stages (20 - 29) of the address register are binary 1's. This is signified by decoder 22 and applied to gate 37. Gate 35 may then provide a transfer T/AD signal.

A shift signal is generated at the end of every twenty frames of display. Each frame of display is counted by gates 40 and 41 and scaler 43. The occurrence of a complete frame is detected when decoders 12 and 22 both indicate that the contents of the address register is zero, which further indicates that all memories have been addressed and read out to digital-to-analog converter 16. This occurs when the outputs of flip-flops FF5 and FF1 are false. Gate 40 applies a signal to a 1/10 scaler 43, which also receives an enabling signal from gate 41. When scaler 43, which may be in the form of a binary counter, counts ten pulses or inputs it applies a signal to flip-flop 44 and flip-flop 45. In this manner, the number of pulses passing gate 40 are divided by twenty to count twenty frames of display. Flip-flop 45 will be set either to enable shifting of the data in memory system 15 or inhibit shifting.

The shift signal (SH) is also utilized to enable the operation of gates 29, 31, 32 and 41.

FIGS. 3a, 3b and 3c show the various waveforms that are generated by the control logic 21 and the time relation thereof. The basic construction of the logic control is the chain of ten flip-flops arranged without carry but with shifting to generate the waveforms F1 - F10 and $\bar{F1}$ - $\bar{F10}$. In the further description of operation of the system the signals derived from control logic will bear the reference designation shown in FIGS. 2 and 3*a* - 3*c*.

The signals to be monitored HR1 - HR4, UC1 - UC4, together with the common lines G1 - G4, are each applied to a gating network 50 - 61. Each of the gating networks comprises a field effect transistor 62 and a gating transistor 63. Gating or enabling signals are derived from decoder 12 and also from the $2^{10}$ bit 12*a* of the address register 12. Reference is first made to the tabulation shown in FIG. 4*a*. As previously stated, the digital words of the memory system are classified into eight columns. Each column will contain a number of word addresses totaling 1024.

Figures 4, 4A:
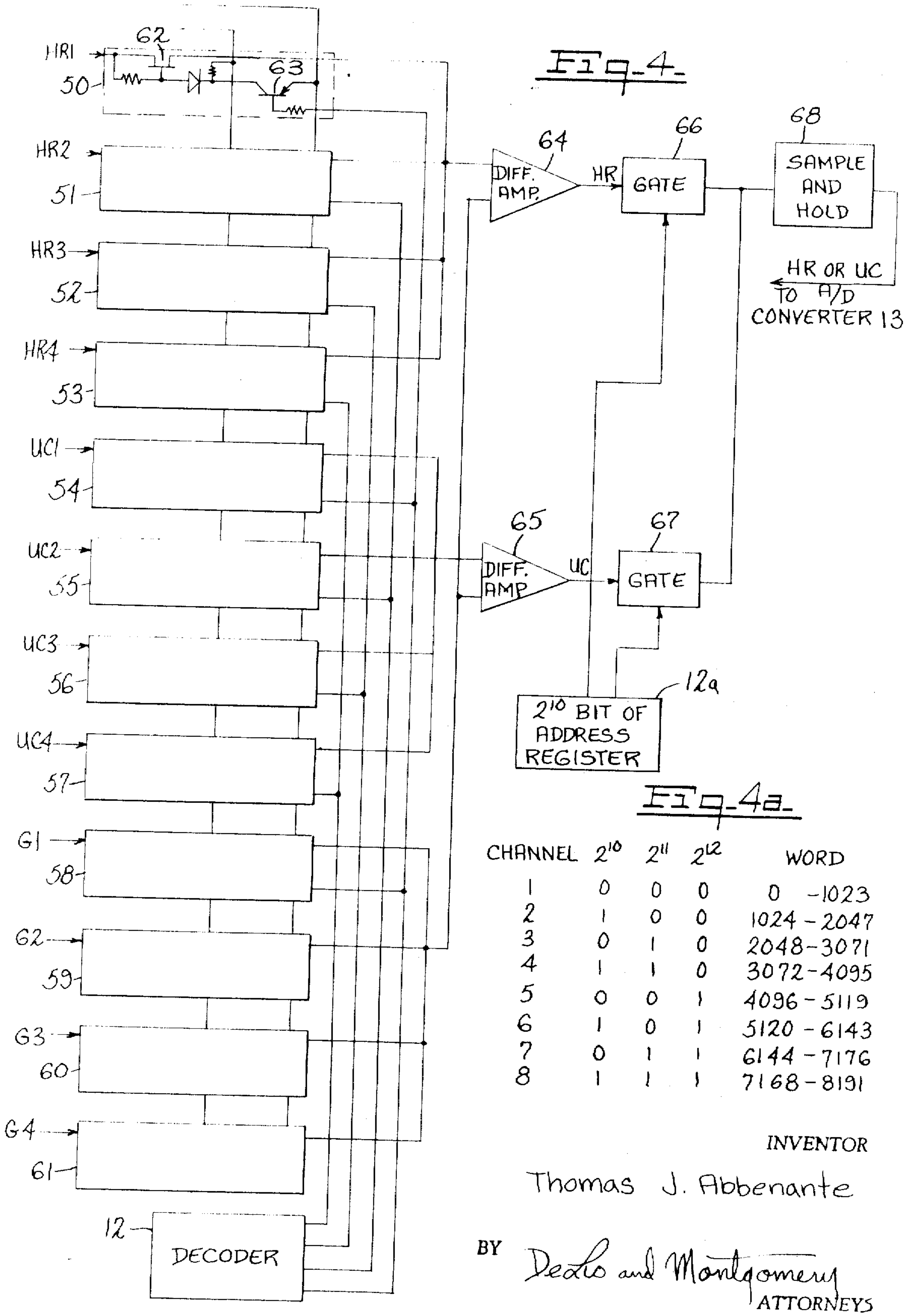

It will be recalled that the address register was a thirteen bit binary counter. Therefore, a binary 1 will not appear in the $2^{10}$ bit until the counter reaches the number 1024. Accordingly, if the last three bits of the address register are all binary 0's, this will indicate that the digital word to be addressed is in the first channel. FIG. 4a further shows the manner in which the binary states of the $2^{10}$, $2^{11}$ and $2^{12}$ bits of register 20 will appear for each channel of memory system 15. Accordingly, by decoding the last three bits thereof, a particular channel in the memory system is selected. As the address in address register 20 advances, decoder 12 will supply gating signals over lines A1, B1, C1 and D1, which correspond to the channels A, B, C and D in FIG. 1. Let it be assumed that decoder 12 indicates that the proper address is in the $2^{10}$ bit. Then a gating or enabling signal is applied over line A1 to gating networks 50, 53 and 57. The HR1 and G1 signals are applied to a differential amplifier 64 and the UC1 and G1 signals are applied to a differential amplifier 65.

The differentially amplified HR and UC signals are applied to gates 66 and 67, respectively. Referring again to FIG. 4*a*, it will be seen that the channels of the memory system alternately appear as binary 0 and binary 1 in the $2^{10}$ bit of the address register. Thus, all of the oddnumbered channels 1, 3, 5 and 7 that store HR signals are signified by a binary 0 in the $2^{10}$ bit, while all of the even-numbered channels 2, 4, 6 and 8, in which the corresponding UC signals are stored, are indicated by binary 1's. Accordingly, decoding the state of the $2^{10}$ bit, the appropriate channel is further located. During the time in which the words 0 to 1023 are addressed in memory system, gate 66 will pass the differentially amplified HR signal. When the address register reaches 1024 through 2047. Gate 67 will be enabled and gate 66 closed. In this manner, the instantaneous waveform of the HR and corresponding UC waveforms with respect to their common ground are applied to a sample and hold network 68 which samples the instantaneous magnitude of the applied voltage and briefly holds such magnitude while it is applied to analog-to-digital converter 13 and, hence, stored in buffer storage register 14 prior to being forwarded to the appropriate channel and address in memory system 15.

The memory system 15 may be a well known magnetic core memory system constructed and arranged to have eight planes, 8192 cores in each plane to provide 8192 8-bit words. A memory system of this type which has been used is one marketed by Standard Memories, Inc. of Santa Ana, California, under the trademark Micro Stor.

In practice, two of such memory systems each having 4096 8-bit words have been used in party-line arrangement to provide the desired array. Such memory systems are well known, commercially available, and are described in various texts including Digital Computer Principles by the Burroughs Corporation, published by McGraw Hill Book Company, Inc. Library of Congress Catalog Card No. 6213207 and, specifically, page 397 through page 410. However, such storage systems are utilized in a new and unobvious manner in accordance with this invention and, therefore, a brief description thereof is set forth for purposes of orientation.

The memory system 15 is designed to operate in either of two cycles of operation. During a Read/Restore cycle the content of an addressed word is read into a storage register for presentation to peripheral equipment. This clears the memory cores of that word, but the word is then restored to the addressed word memory cores. The Clear/Write cycle is similar. The cores of the addressed word are cleared, but the information therein is not applied to the storage register. Immediately after clearing, new data in the storage register is written into the cleared cores.

Both of these cycles of operation are initiated by a CI pulse in conjunction with a R/R or C/W signal when such signal is high, as exemplified in FIG. 3*b*.

Figure 5:
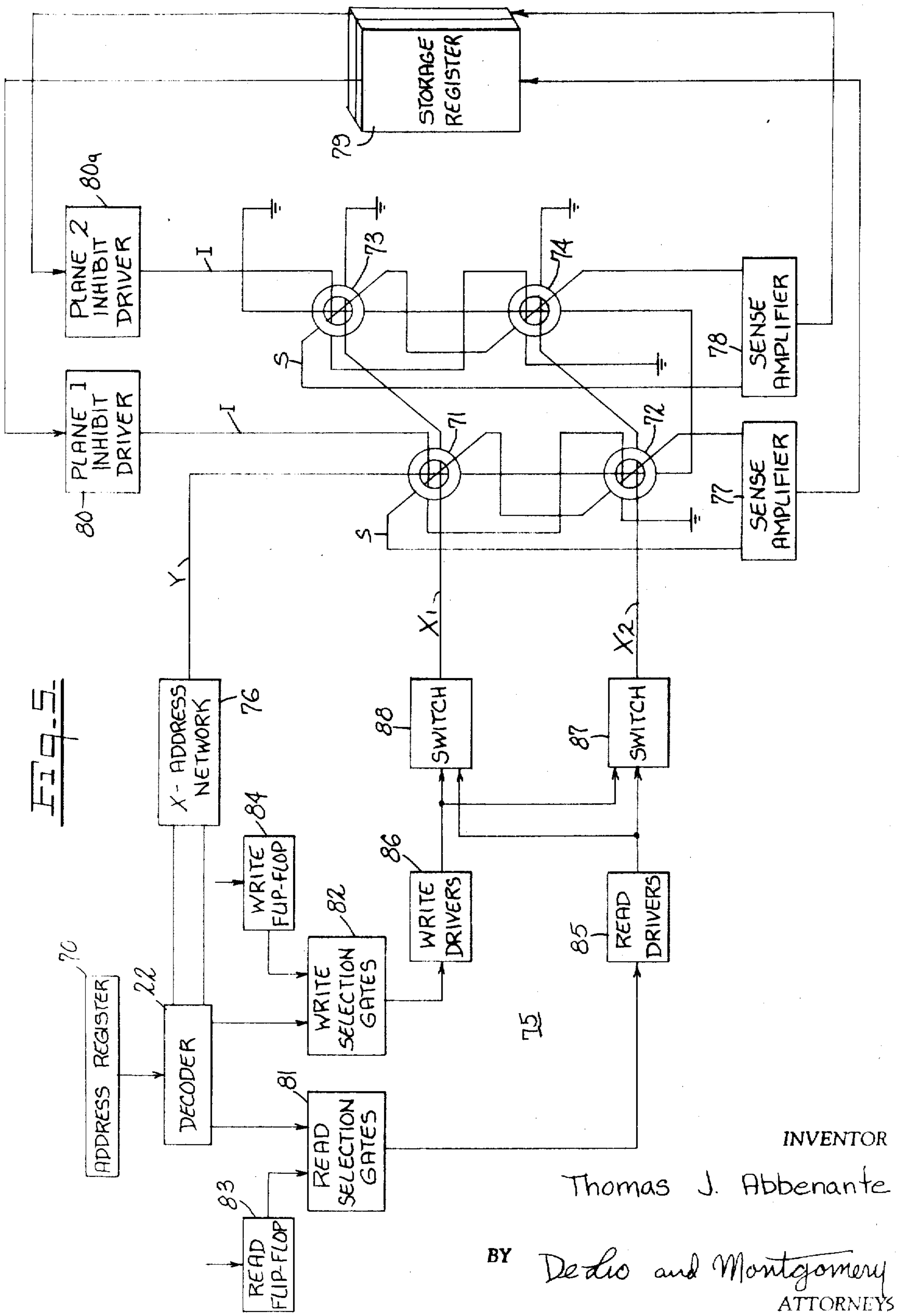
FIG. 5 is a diagram, partly schematic and partly in block form exemplifying a magnetic core memory system.

The memory system 15 includes its own address register 70 which is slaved to address register 20. In FIG. 5 the memory system is exemplified by two planes of two cores each. The first plane contains cores 71 and 72 and the second plane contains cores 73 and 74. Cores 71 and 73 are associated with one word or address and cores 72 and 74 are associated with another word or address. Each core is threaded with four wires. A particular word is selected or addressed by coincidence currents through an X and Y line selected by the decoder and X and Y address networks 75 and 76. Y address network 76 is identical to X address network 75 and is shown only in single block form. Every core in each plane is also threaded by an inhibit line I which, when energized, partially magnetizes the core in such a direction as to prevent a binary 1 from being written therein. Each core in a plane is also threaded by a sense line S which will sense switching of the core in either direction.

The magnetic cores are of the substantially rectangular hysteresis type and are driven between a binary 1 and binary 0 saturation state by X and Y coincident currents of predetermined magnitude which produces sufficient magnetic flux to effect a change in saturation. If the direction of the cumulative current through the X and Y lines threading a core is positive and reaches the switching value, the saturation of the core will be switched to a binary 1 state, if it is not already there. Similarly, if the direction of the cumulative current to the X and Y lines is in a negative direction the state of saturation of the core will be switched to a binary 0 state, if it is not already there.

The cores of a word or address are "read" or cleared when they are switched to a binary 0 state. The change of flux therein upon such switching is applied to the sense amplifiers 77 and 78 for each plane of the address and the sense amplifiers then transfer the Read bits to an internal storage register 79. It will be understood that if no change of flux is sensed in a core during the Read operation, this will indicate that such core was already in a binary 0 state.

Conversely, when the cores are operated in a Write state the direction of the cumulative current through the cores in the plurality of planes forming a given address is such as to switch the cores to a binary 1 state. Such switching would occur at all the cores in an address if the cores of selected planes were not inhibited. In such operation, a half current is applied to the cores in the planes where a binary 0 is to be read in. Such inhibit current is in opposition to the X current and therefore prevents the cores from being switched to a binary 1 state. Selected inhibit drivers are enabled during a Clear-Write cycle by the presence of a binary 0 in storage register 79. In this manner, a numerical word may be read into a selected word or address from storage register 79 through use of the X and Y lines and the inhibit drivers 80 and 80*a*.

The address selected by decoder 22 is applied to an X line detection network which comprises Read selection gates 81 and Write selection gates 82. Such gates are open, dependent upon the state of a Read flip-flop 83 and a Write flip-flop 84. When a gate associated with a particular selection address has been opened it will energize an associated driver 85 or 86 for either a Read or Write operation. The driving current is applied through switches 87 and 88 which may be in the form of pulse transformers. The pulse transformers also provide a convenient means for developing opposite currents required during the Read and Write cycles. Two primary windings are wound on each switch core. The primary winding actuated by a Write driver is wound in a direction opposite from that winding associated with the read driver. As a result, the output current from the selected switch core flows in one direction during the Write phase and in the opposite direction during the Read cycle. This permits the writing or restoring of a binary 1 during storage or restorage of data and a binary 0 during reading or clearing of data from an addressed word.

Consider now the operation of network of FIG. 5 and assume that a binary word 10 is to be written into the address defined by cores 72 and 74. In this case, the binary code in the address register corresponding to the address number of the address or word comprising cores 72 and 74 is selected. As a result, the decoder 22 applies signals to Read selection gates 81 or Write selection gates 82. The selection gates will be enabled dependent upon whether the mode is Read/Restore as determined by the coincident occurrence of C1 and R/R or Clear/Write as determined by the coincident occurrence of C1′ and R/R.

At this point it is to be understood that Y address network 76 is identical to the X network. Assume that flip-flop 83 receives a R/R signal and the appropriate one of drivers 85 connected to line X2 is energized, switch 88 will produce a Read pulse over line X2 to cores 72 and 74. Such pulse will produce a current in a direction to set the cores 72 and 74 to a binary 0 state. However, core 74 is already in a 0 state. Therefore, only core 72 is switched. Such switching is sensed by amplifier 77 which sets a binary 1 in the first position of storage register 79. The second position is not set. Therefore, the binary 10 is set in storage register 79. This operation momentarily clears cores 72 and 74.

Then, the binary 10 may be set in cores 72 and 74 in a Restore operation, as will hereinafter be more fully explained. During such Read/Restore operation the Plane II inhibit driver 80*a* will produce an inhibiting half current through core 74 and prevent it from being set to the 1 condition. No such inhibit current will be produced through core 72 and it will be set to the 1 condition.

Storage register 79 is internal to memory system 15 and connected to buffer storage register 14 as hereinafter described. Storage register 79, in practice, contains a number of stages equal to the number of planes in the matrix. The memory system contains inherent timing networks to reset storage register 79 after data stored therein has been written into a memory address, and is further arranged.

Figures 6, 8:
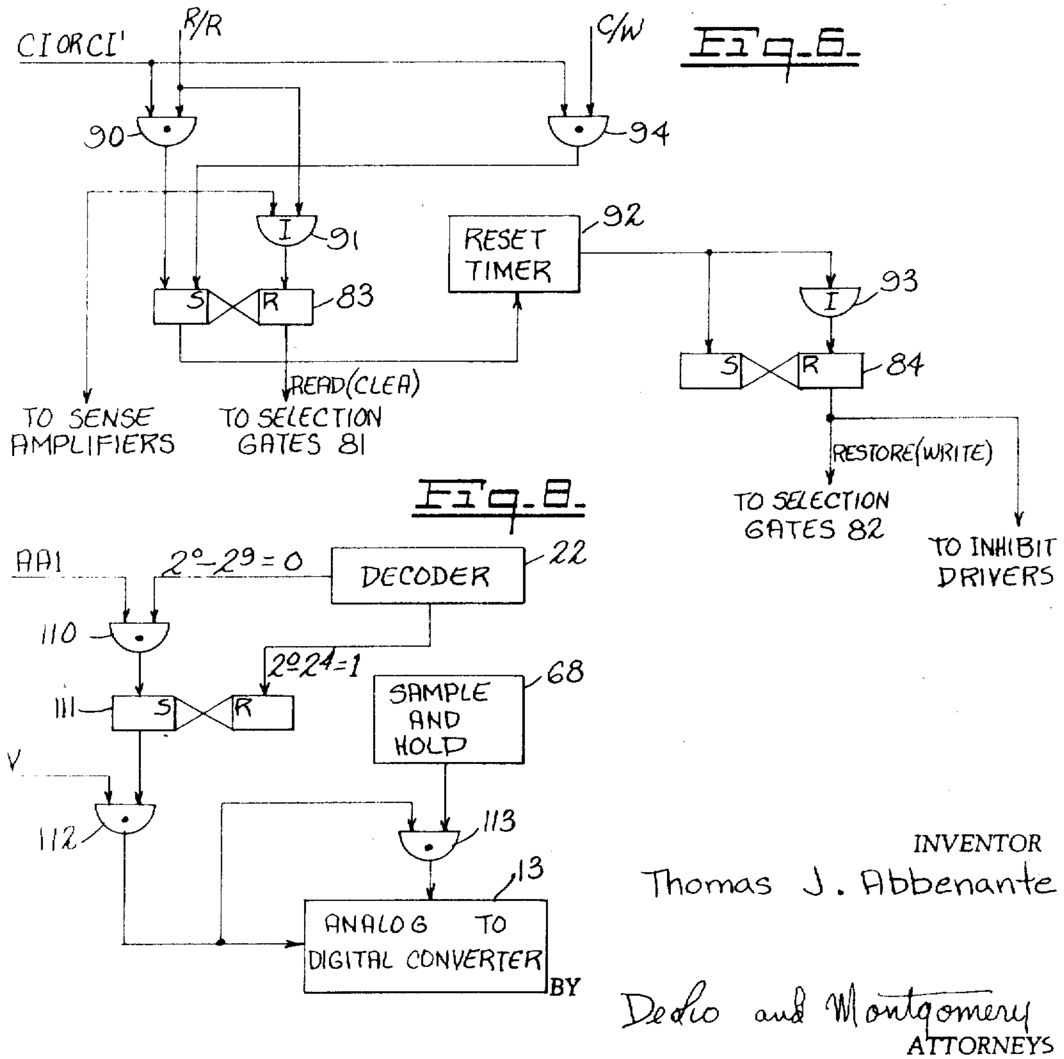
FIG. 6 is a diagram in logical schematic form exemplifying the manner in which the waveforms of FIGS. 3*a* and 3*b* are utilized in controlling the operation of the memory system.
FIG. 8 is a schematic diagram in logic form exemplifying application of data to the analog-to-digital converter of FIG. 1.

This operation may be exemplified by reference to FIG. 6 which includes Read flip-flop 83 and Write flip-flop 84.

During a Read/Restore cycle, a gate 90 sets Read flip-flop upon receipt of a C1 pulse and a high condition of R/R. The output of gate 90 may also be utilized to directly or indirectly enable sense amplifiers 77 and 78. This results in reading of the addressed word.

Upon termination of the C1 pulse, Read flip-flop is reset through inversion gate 91. This applies a signal to a reset timer 92 which may be a one-shot multivibrator. Reset timer 92 in turn applies a setting pulse TR to Write flip-flop 84 for a time duration essentially equal to a C1 pulse. This results in restoring of the Read word to the address. The inhibit drivers may be enabled by the output of flip-flop 84. Flip-flop 84 may be reset upon change in voltage level of the pulse from timer 92 through inversion gate 93.

During a Clear-Write cycle, the operation is similar in that when a C1 pulse occurs when C/W is high, Read flip-flop 83 is set through gate 94. However, the sense amplifiers are not enabled and the addressed cores are cleared. Then when Write flip-flop 84 is set, new data is read into the addressed cores.

It is to be understood that the systems exemplified in FIGS. 5 and 6 are set forth for purposes of background orientation and illustration and do not represent any particular magnetic core storage system. Any such storage system which is adapted to satisfactorily respond to the command signals utilized in the overall monitoring system may be used in the invention. In FIG. 5, the storage register 79 is shown as having only two bits; however, in the disclosed invention, the storage register 79 has a number of bits corresponding to the number of bits in a memory word.

Figure 7:
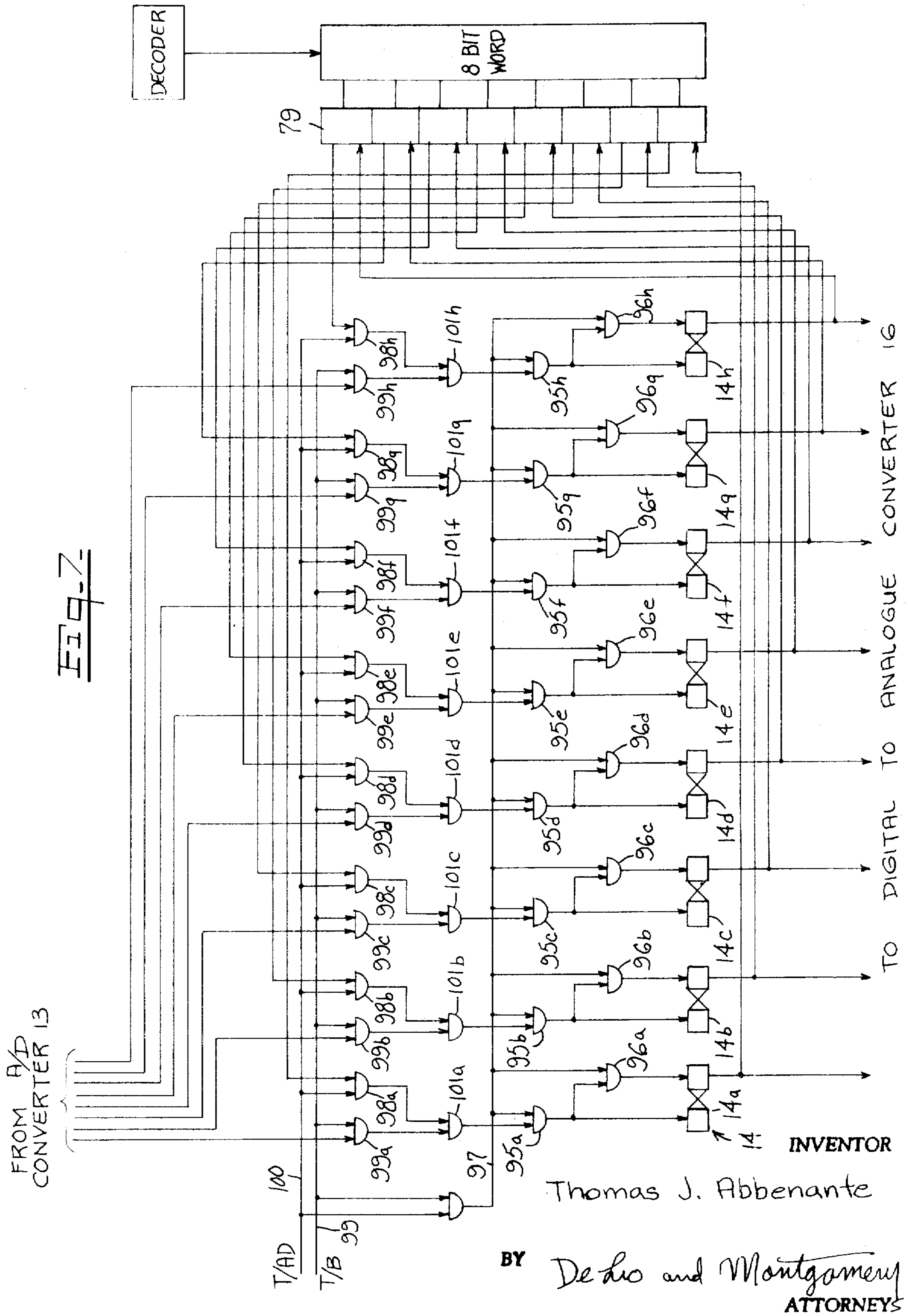
FIG. 7 is a diagram in schematic form of the buffer register shown in FIG. 1, and further showing the manner in which data is transferred thereto and therefrom.

Reference is now made to FIG. 7 which illustrates the buffer register 14 as comprising a plurality of memories in the form of flip-flops 14*a* – 14*h*. These flip-flops are set or reset to hold an 8-bit word from either analog-to-digital converter 13 or from a word of register 79 of memory system 15.

The flip-flops 14*a* – 14*h* are set or reset through one of "and" gates 95*a* – 95*h* and an inversion gate 96*a* – 96*h*, when such gates are enabled by one of transfer signals T/B or T/AD over line 97.

Gates 98*a* – 98*h* are enabled to pass a bit from a memory address through register 79 to buffer register 14 upon application of a transfer signal T/B to line 98*a*, FIG. 6. This transfer signal is derived from gate 35, FIG. 2.

Gates 99*a* – 99*h* are enabled to pass a bit from analog-to-digital converter 13 to buffer register 14 and, hence, memory 15 upon application of a transfer signal T/AD to line 100 from gate 34, FIG. 2.

Gates 101*a* – 101*h* are "or" gates which pass either signal from gates 98*a* – 98*h* or 99*a* – 99*h*, respectively.

The flip-flops 14*a* – 14*h* of buffer register 14 will thus accept a numerical word from analog-to-digital converter 13 for transfer to storage or a numerical word from memory system 15 for application to digital-to-analog converter 16. The register 79 comprises eight flip-flops which are set or reset each time a numerical word is applied thereto in the same manner as flip-flops 14*a* – 14*h*.

Reference is now made to FIGS. 3*a* and 3*b*.

The address advance signals AA1, AA2 and AA3 derived from gates 29, 30 and 31 are applied to the address register to advance the address therein. The signals AA1 and AA2 will be considered to be add signals even though they decrement the number from the higher address towards the lower address. The signal AA3 will be considered to be a subtract number in that it will advance the address in the register from a lower to the next higher number. Reference to FIG. 3*a* will show that the add pulses AA1 and AA2 occur only when the advance signal is high, and the pulse AA3 occurs only when the subtract signal is high. The advance and subtract signals which are derived from flip-flop F1 are applied to the borrow and carry gates of address register 20 to command the operation thereof when the pulses AA1, AA2 and AA3 are applied thereto. Address register 20 is a ripple type counter.

The data transfer pulse T/AD is utilized as a transfer or gating signal to gate a numerical word at analog-to-digital converter 13 to storage register 79 through buffer register 14. Data transfer pulse T/B is also utilized as a gating signal to gate the numerical word from a selected address in memory 15, appearing in storage register 79, to buffer storage register 14 for presentation to digital-to-analog converter 16.

Consider now the operation of the overall system and assume that the system is in a twentieth frame of display. During these twenty frames of display, sampled waveforms are not stored in the system. The system is only in a display mode.

Figure 9:
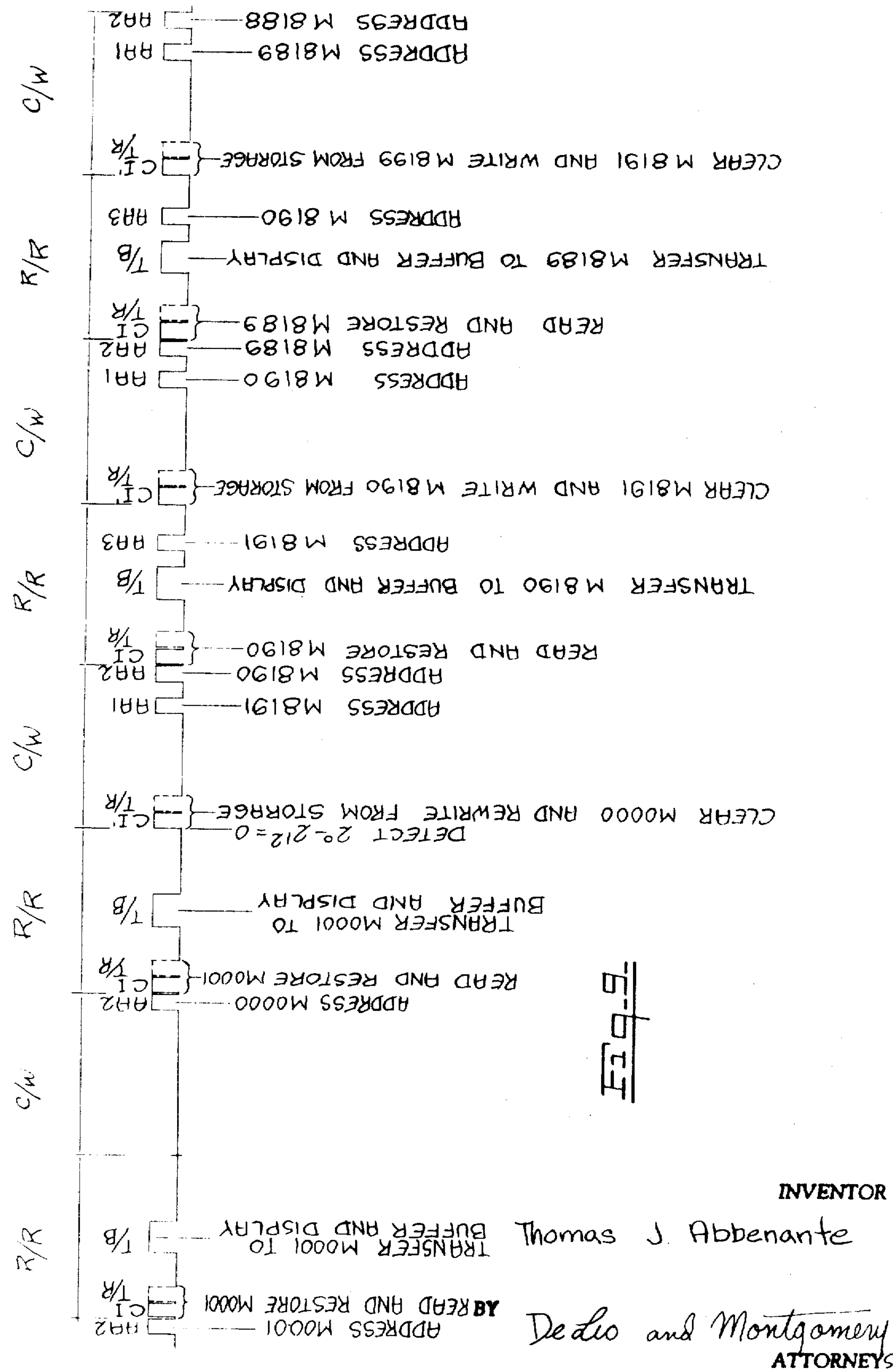
FIGS. 9 and 10 are waveform diagrams exemplifying the modes of operation of the system in displaying stored information and accepting new information.

Assume that the numerical word at address M0001 is being addressed and refer to FIG. 9. FIG. 9 illustrates composite timing and enabling signals as the mode of operation changes from display to shift and display. The various stations or addresses in the memory 15 will be identified by the prefix M followed by the numbered address. The 8192 addresses are divided into eight columns of 1024.

Upon occurrence of the CI pulse, when R/R is high, M0001 is read and the sense amplifiers in the memory transfer the data to register 79. The internally generated timing reset pulse TR then restores the data to M0001. Then upon occurrence of transfer pulse T/B the data in register 79 from M0001 is read into buffer register 14 for application to digital-to-analog converter 16 and display.

At the next AA2 pulse, the address advances to word M0000, and the same operation occurs. At this time, the address register shows all binary 0's, this is detected by decoders 12 and 22. A pulse count is applied to scaler 43 from gates 40 and 41, FIG. 2. This indicates the completion of twenty frames of display. Flip-flop 45 is set in a shift state and the signal SH is applied to gates 29, 21 and 32. The shift state is detected during the first portion of a C/W cycle during F15 and a CI' pulse from gate 32 will initiate a Clear/Write operation on M0000. M0000 is cleared, but the data is still in register 79 from the previous Read/Restore operation. Thus the same data will be written back in M0000. The SH signal results in the production of pulses AA1, AA3 and CI' during each cycle of operation. Such operation will continue through one frame of operation until flip-flop 45 is reset. During this frame of operation, the eight stored waveforms will be displayed. The oldest data word in each column is discarded, each data word is shifted to the next address, and a new data word is written in the open address.

Upon successive occurrences of AA1 and AA2, the address advances past M8191 to M8190. At the next C1 pulse the sense amplifiers are enabled and the content of M8190 is transferred to storage register 79 and restored at TR. At the next T/B pulse, this data is transferred to buffer register 14 for storage and display. Then at AA3, the address advances to M8191.

At the following C1' and TR pulses, a Clear/Write operation is performed. The cores of M8191 are reset as in a Read operation; however, the sense amplifiers 77 and 78 do not receive an enabling signal as during R/R and the data in M8191 is destroyed. At the completion of the CI' pulse, a Write operation is initiated by the following pulse TR and the data from M8190 in storage register 79 is written into M8191. In this manner the data at each station or address in the eighth column (M7168 – M8191) is shifted to the next higher address and simultaneously presented for display.

When the address register advances to M8191, the $2^0 - 2^9$ bits of the address register show all 1's or $\bar{1}$'s. This indicates that the address has changed columns. As will hereinafter be made apparent, the address may momentarily change columns. Therefore, it is necessary to detect when the address changes columns for operation in the next column. When such detection is made, analog-to-digital converter 13 is reset and enabled for a predetermined time to take a sample of the appropriate on-line signal and then convert it to digital form. This operation is illustrated in FIG. 8.

A gate 110 responsive to decoder 22 senses when the $2^0 - 2^9$ bits are all 1's at the occurrence of an AA1 pulse. The AA1 pulse occurs only during a shift cycle and the last word of a column is addressed at an AA1 pulse when the address moves to a new column for operation therein. Gate 110 sets a flip-flop 111. Flip-flop 111 is reset when the address register advances a predetermined number, which is exemplified as fifteen counts, when the $2^0 - 2^4$ bits all show 1's. So long as flip-flop 111 is set, a gate 112 is enabled which applies a high level signal to analog-to-digital converter 13. This signal initially resets converter 13 and when high also opens gate 113 to pass the contents of sample and hold network 68 to converter 13. When the signal level from gate 112 changes, the input to converter 13 changes and the sample to converter 13 is complete. The conversion takes place thereafter and the sampled signal will be available in binary form for transfer to word M7168 as hereinafter described.

Figure 10:
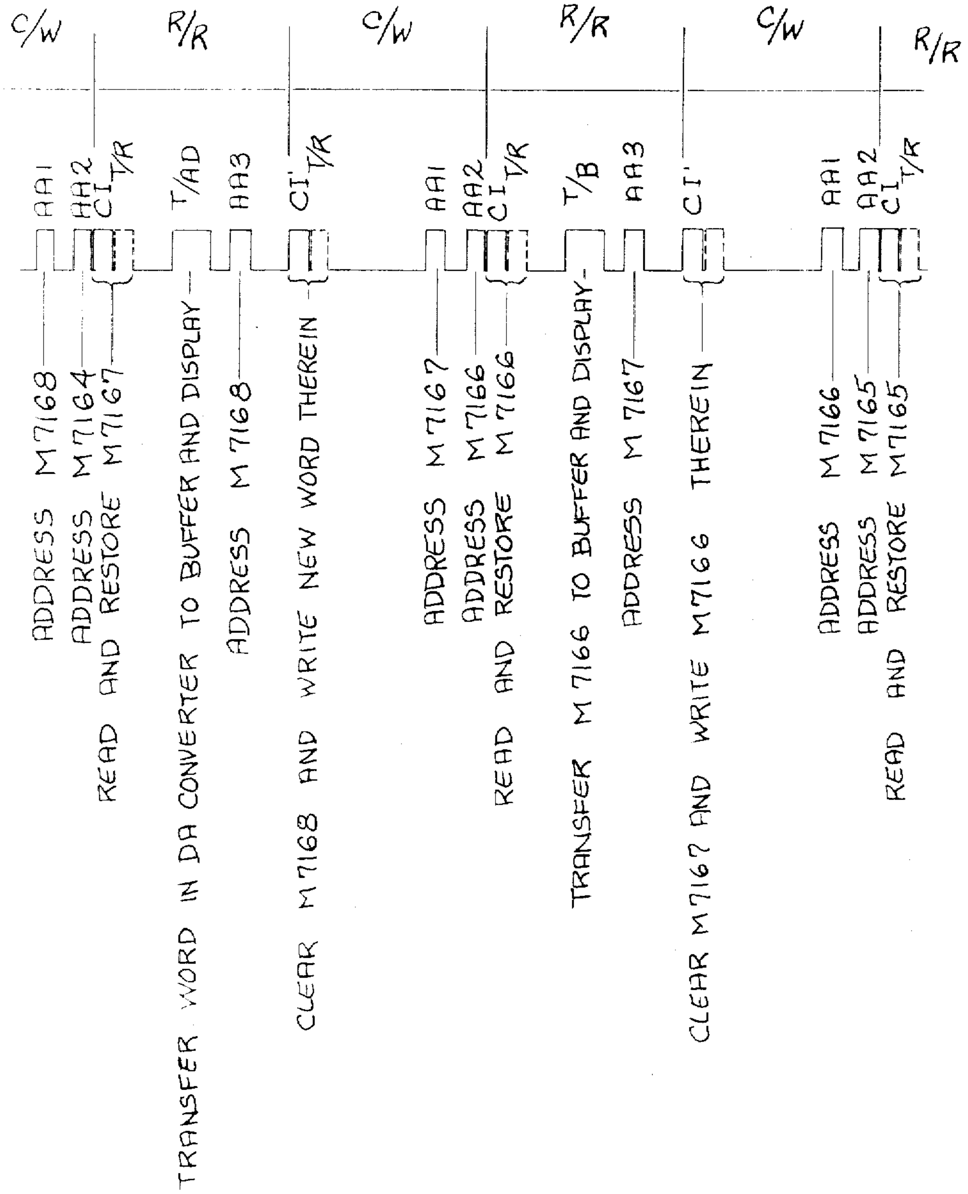

Assume now that the address has advanced along column eight (M7168–M8191) displaying the stored history of waveform UC4 and shifting each stored piece of data to the next address or station, and the address register now addresses M7170. Refer now to FIG. 10.

The next AA1 and AA2 pulses will advance the address to M7168 which is the first word in the eighth column. Then at pulse CI, when R/R is high, the information in M7168 is read into storage register 79 and at TR is restored to M7168. When transfer pulse T/B occurs, this information is gated from storage register 79 into buffer register 14. This also results in this information being applied to digital-to-analog converter 16 and, hence, to the deflection controls of the display tube. At this time, the $2^{10} - 2^{12}$ decoder 12 senses from the address register that the words in the eighth column are being addressed and so signifies to the vertical deflection addresser 18. The vertical deflection addresser is merely a bias network which properly orients the vertical deflection of the CRT for the memory column being addressed. Before the level of R/R changes, pulse AA3 advances the address to M7169.

At the next CI' pulse the cores of word M7169 are cleared. The data in register 79 from M7168 is written into M7169. The next AA1 and AA2 pulses advance the address to word M7167. When this occurs, M7168, the first word in the eighth column is by-passed and the last word in column seven is addressed. This condition is detected by decoder 22 which senses that the $2^0 - 2^9$ bits of the address register are all $\bar{1}$. This opens gate 37, FIG. 2, at F15, FIG. 3b, and during F19, a T/AD transfer pulse from gate 36 is passed by gate 35. At this time, gate 37 holds gate 34 off during F15. As a result, the T/AD pulse gates the sampled data in analog-to-digital connector 13 into buffer register 14. When gate 37 closes, the inverted output again allows gate 34 to pass a T/B pulse from gate 36. Both transfer pulses occur during F19.

At the next AA3 pulse, the address returns to M7168. Then at the next CI' pulse during C/W high, the word in the cores of M7168 is cleared and the new data in buffer register 14, which is a sampling of UC4, is written into M7168.

The next AA1 and AA2 pulses advance the address to M7166 in the seventh column. It will be noted that the address will return to M7167 at the next AA3 pulse and decoder 22 will detect that $2^0 - 2^9$ is all 1 or not $\bar{1}$. However, this now occurs during a time $F\bar{3}4$ in the cycle when gate 37 is not open (F15) and no transfer pulse T/AD is generated. A transfer pulse may be generated only during time F15 and F19. This time occurs following a CI pulse when R/R is high. Thus a T/AD transfer pulse is generated only when the last word in a column is addressed by an AA2 pulse, and during the following time when R/R is high.

At the last AA1 pulse, the address was at M7168. This was detected and a sampling of HR4 commenced as described above. The sampled and converted value of HR4 is then ready for insertion at M6144 upon occurrence of the next T/AD transfer pulse and the following C/W cycle.

The system now operates through a shift cycle, shifting the word in each address to the next address while clearing the last address in each column. The system further recognizes the end of each column and inserts a new sample of the corresponding waveform therein through the network of FIG. 4 and analog-to-digital converter 13.

While the disclosed system has been exemplified as using particular component parts, it is to be understood that such component parts have been selected only for their functional operation. For example, the memory system 15 has been exemplified as a magnetic core storage system. However, it will be apparent that other storage systems using different components such as flip-flops or other bi-stable controllable switches could be used to provide the same function.

The invention may also be embodied in a system utilizing recirculating technology. In such systems, the stored words may be in a recirculating register in which the information is continually circulating. In this situation, new words are inserted at the appropriate time and the oldest word discarded. Such recirculating systems may be a series of flip-flops as may be found in an integrated circuit, any circulating shift register or a delay line of appropriate lengths as exemplified in FIG. 11.

Figure 11:
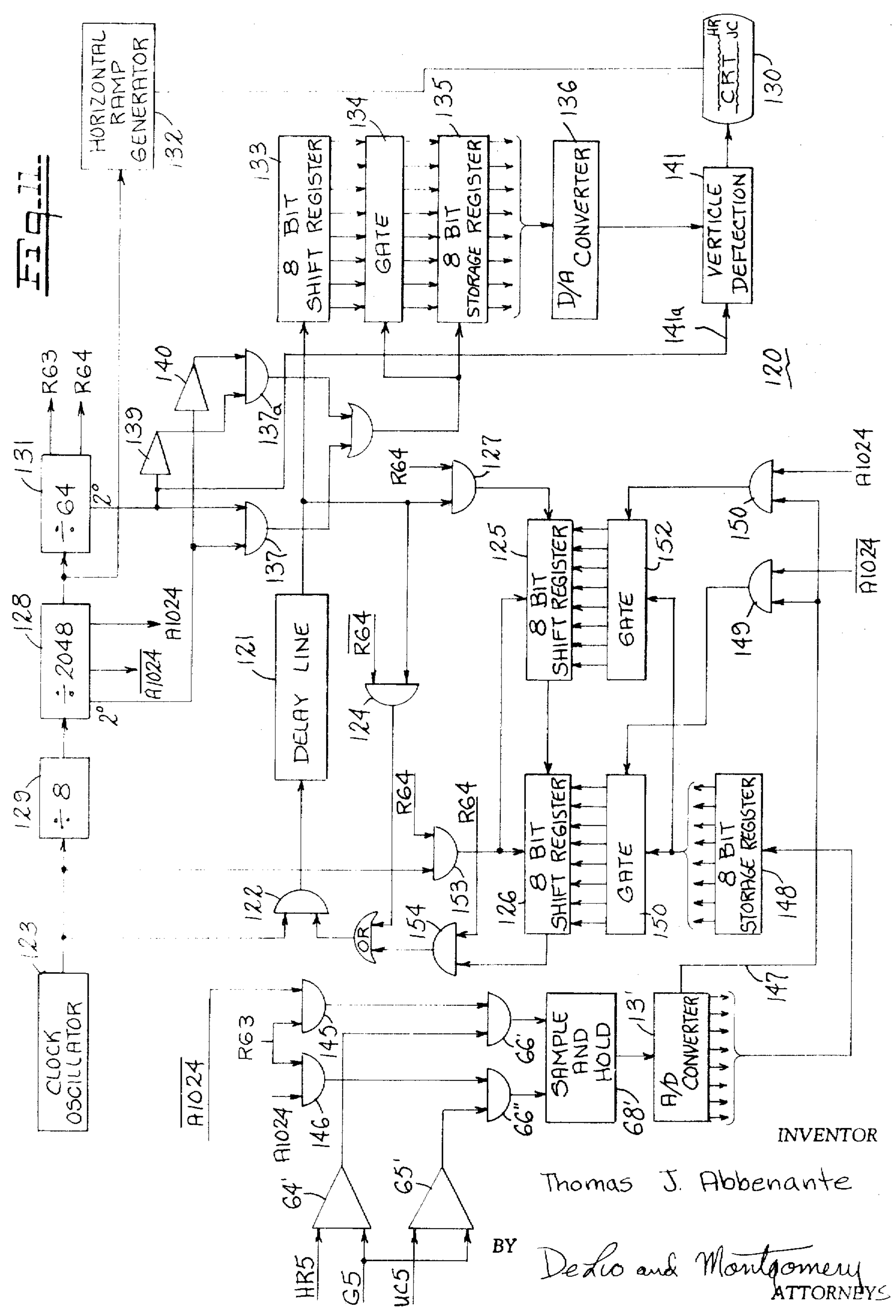
FIG. 11 illustrates in schematic form a system embodying the invention which utilizes a continuously recirculating memory system.

In the system 120 of FIG. 11, circuit and network elements which are the same as those of FIG. 1, bear the same reference numeral primed.

System 120 includes a recirculating register in the form of delay line 121. Information is applied to delay line 121 through gate 122 and the digital information is indicated by the presence or absence of a clock pulse. A clock oscillator 123 provides pulses at 2 megahertz frequency. For purposes of discussion, each stored waveform will be considered to be indicated by 1024 words. Each delay line 121 is selected to store 2048 eight-bit words. The stored words alternately represent HR5 and UC5 waveforms. The data stored in delay line 121 during the normal display mode of operation recirculates through a loop including gate 124. When the stored data is updated after a display cycle, the data recirculates through a loop including shift registers 125 and 126 and gate 127. The gates 124 and 127 act like a single pole, double throw switch.

The address counter or address register 128 is in the form of an eleven-bit binary counter which will overflow at a count of 2048. The address register receives as its input the overflow of a three-bit binary word counter 129 which counts to eight clock pulses and then overflows. The word counter 129 counts the number of binary digits in a word which is applied to delay line 121 through gate 122 and upon overflow indicates to address register 128 that a word has been inserted into delay line 121.

Overflow of the address register indicates that 2048 words have recirculated to a given position in the recirculation loop which indicates one frame for display on CRT 130. A frame counter 131 indicates when 63 and 64 frames have been displayed by the signals R63 and R64. The signal R63 indicates that all bits are 1's and the signal R64 indicates that all bits are 0's.

The horizontal deflection circuit of CRT 130 has the usual horizontal sweep circuit which is under the control of a horizontal ramp generator 132. The ramp generator 132 is reset to initiate another sweep when the address register counts to 2048.

At any given time, the delay line and its associated recirculation loop contain 2048 eight-bit words. Each word exiting from the delay line is applied to an eight-bit shift register 133. When enabled, an eight-bit gate 134 transfers the contents of shift register 133 to storage register 135. The word number in storage register 135 is then applied to digital-to-analog converter 136 and the resultant analog voltage is applied to vertical deflection circuit 141 which vertically modulates the sweep of CRT 130 to display the stored waveform.

The words representing the HR and UC waveforms are alternately stored in delay line 121. Accordingly, every other word exiting from delay line 121 must be read into storage register 135 during each recirculation cycle to properly display the HR or UC waveform during one frame of display. The HR waveform and the UC waveform are alternately displayed. A display cycle comprises 64 frames of display.

To select the proper words during a display frame, gate 137 senses the 2° bits of address counter 128 and frame counter 131. When both bits are zero, this indicates that an even-numbered word address is present and an even-numbered frame is being displayed. Accordingly, gate 137 applies an enabling signal through OR gate 138 to gate 134 and the word contents of shift register 133 is transferred to storage register 135 for conversion to an analog vertical deflection voltage.

Gate 137*a*, through inverters 139 and 140 sense when the 2° bits of counters 128 and 131 are not zero. This indicates that an odd-numbered word address is present during an odd-numbered display frame. Therefore, only UC words are passed to storage register 135. It will be apparent that during an HR display frame (2° bit of counter 131 is zero) gate 137 will not open during an odd-number address in counter 128 (2° bit is one). During a UC display frame, gate 137a will not open during an even-number address in counter 128.

The 2° bit of counter 131 further sets the position bias on CRT 130 to the proper position during a display frame over line 141*a*.

The screen of the CRT 130 is of the long persistence type and the alternate HR and UC sweeps will be viewed essentially in exact phase relation. Where the clock frequency is two megacycles, a display frame occurs approximately every 8 milliseconds. Thus, each waveform will by displayed over 50 times per second.

During a display cycle of sixty-four frames, all words exiting from delay line 121 are passed by gate 124 and recirculated. When sixty-four frames have been displayed the stored waveforms are updated.

When frame counter 131 has counted the sixty-third frame of a display cycle, it provides a signal R63 which is applied to gates 145 and 146. During this frame of display, when the address is less than 1024 as indicated by the signal $\overline{\text{A1024}}$ from counter 128, gate 145 is opened which in turn opens gate 66' and applies the HR5 waveform to sample and hold circuit 68'. During the time when counter 128 counts from 0 to 1023, the sampled signal is applied to analog-to-digital converter 13' and converted to an eight bit word. When the conversion is complete, this is signified over line 147 which enables storage register 148 to accept the digital word from converter 13'. At the same time, gate 149 is enabled and transfer gates 150 transfer the newly sampled work to shift register 126.

When counter 128 reaches address A1024, gate 146 is opened which in turn opens gate 65' and passes a sample of the UC waveform to sample and hold circuit 68' and A/D converter 13'. When the conversion is complete, this sample converted to binary form, is applied to storage register 148. At this time gate 150 enables transfer gate 152, which transfer this new UC word to shift register 125.

The new HR5 and UC5 word samples are now in the recirculation loop when gate 127 is opened. When counter 131 overflows signifying the end of a display cycle, the signal R64 enables gates 127, 153 and 154. The clock pulse output of gate 153 shifts the word bits in shift registers 125 and 126 in synchronism with the clock pulses and the new samples are placed in the zero and first address positions in the recirculation loop. At the same time, gate 124 is opened, so all the stored words recirculate through gate 127 and shift registers 125 and 126 back to delay line 121.

All previous words in the stored waveform are then relatively shifted back two addresses. When counter 128 again overflows, the previous last two word numbers at word addresses A2046 and A2047 will be located in shift registers 125 and 126. When the signal R64 ceases, gate 154 closes and gate 124 opens. Thus, the normal recirculation path is re-established and the last two words are discarded.

In this manner, the history of the two waveforms HR5 and UC5 are simultaneously displayed over a predetermined period of their history and periodically updated.

The recirculating system disclosed is adapted for modular construction. A monitoring system arranged to monitor a plurality of signals or a plurality of pairs of signals may be added at any time as deemed necessary. A plurality of CRT's together with associated circuitry may be stacked in a single console cabinet and added to as the number of signals requiring monitoring increases.

Figure 12:
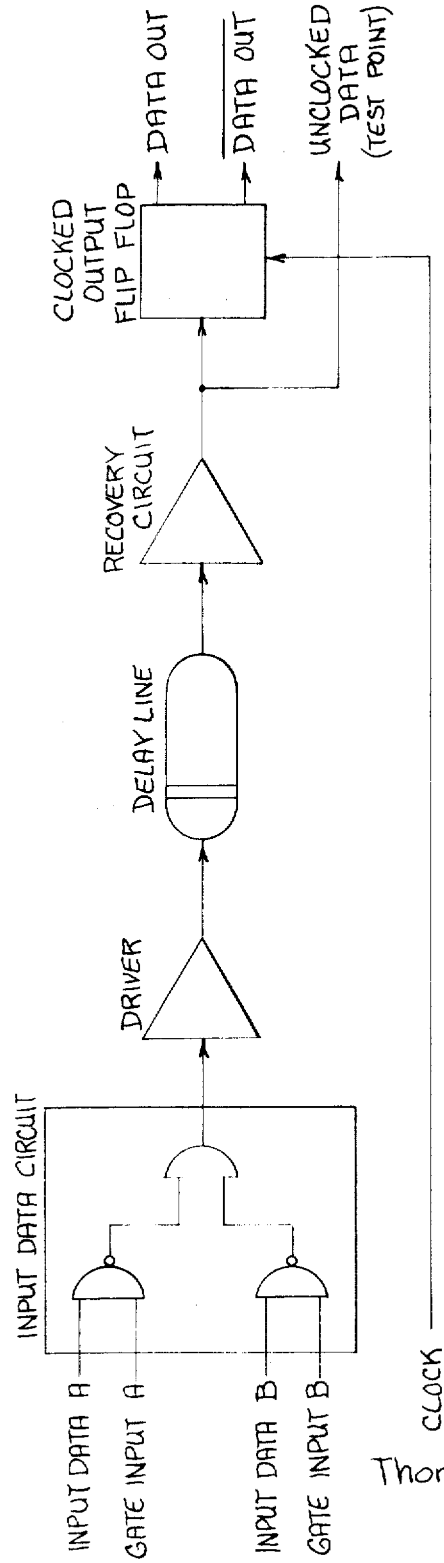
FIG. 12 illustrates in schematic form the delay line system of FIG. 11.

The delay line utilized in system 120 may be of the magnetostrictive type marketed as a synchronous serial memory module by Anderson Laboratories, Inc., 1280 Blue Hills Avenue, Bloomfield, Connecticut, identified as Model No. SM 8.5. This model has a maximum 8.5 microsecond delay and a bit rate of 2.0 megacycles. The exact length of the line is determined by the desired length in microseconds which in the disclosed application is 8192 microseconds. A block diagram of this module is set forth in FIG. 12.

Systems embodying the invention may utilize various types of components which perform the same function. For example, the recirculating memory system exemplified as delay line 121 could take the form of a series of shift stages with the word bits in either series or parallel arrangement. The analog-to-digital converters are preferably of the type which convert the digital voltage back to analog for comparison to determine when the conversion is complete and supply a conversion complete signal. The sample and hold circuits preferably comprise a switch which may be in the form of a field effect transistor which charges a capacitor to the sampled voltage. Other types of well known circuits which perform the same function may be conveniently utilized as desired.

From the foregoing it may be seen that the objects of the invention set forth as well as those made apparent are efficiently attained. While preferred embodiments of the invention have been set forth for purposes of disclosure other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

What is claimed is:

1. A system for simultaneously displaying representations of a plurality of signals which have occurred simultaneously where the representations comprise periodically sampled amplitudes of the signals comprising; a display means having a sweep means for displaying a representation of the amplitudes of each of the signals over a predetermined interval of time, means for periodically sampling the amplitude of each signal, storage means for storing a predetermined number of sampled amplitudes of each signal in the time sequence as sampled, means for applying the stored amplitudes of a first one of said signals to said display means in the time sequence as sampled during a sweep of said display means to provide a signal representation on said display means, said applying means including means for applying successively different ones of the signal amplitudes to said display means in successive sweeps thereof so as to display all said stored amplitudes of said plurality of signals, means responsive to the signal amplitudes being applied to said display means for controlling the position of a sweep on said display means to space apart the signal representations on said display means, and means for eliminating the oldest stored amplitude of each signal from said storage means after said stored amplitudes have been applied to said display means a predetermined number of times and inserting newly sampled amplitudes for each signal in said storage means in time sequence with the previously newest stored amplitudes for each signal.

2. The system of claim 1 wherein said storage means is a recirculating loop having input and output terminals and said amplitudes recirculate therein, means for applying the sampled amplitudes to said input in the time sequence as sampled, and said means for applying the stored amplitudes includes means coupled to said output for selectively applying the amplitudes of only one of said signals to said display means during each cycle of recirculation of said amplitudes in said loop.

3. The system of claim 2 further including a second loop between said input and output terminals, said second loop including second storage means for storing a newly sampled amplitude of each of the signals, and said means for eliminating includes means for periodically recirculating the stored amplitudes through said second loop and inserting the newly sampled amplitudes in said second storage means in place of the oldest stored amplitudes for each signal.

4. The system of claim 1 wherein each amplitude is stored as a binary word, first counting means for counting the number of words applied to said display means to define each display of a signal representation, second counting means for counting the number of displays of the signal representations said means for eliminating being responsive to said second counting means reaching a predetermined count.

5. The system of claim 1 further comprising means for converting each sampled amplitude into a binary word, said storage means comprising a recirculating register having first and second loops, the words normally recirculating through said first loop, second storage means in said second loop for storing newly sampled and converted words, said means for applying comprising means for selectively applying the words representing one of said signals to said display means during each cycle of recirculation of the words, and said means for eliminating comprises means responsive to occurrence of a predetermined number of recirculation cycles of the words through said first loop for routing the words through said second loop and inserting the words in the second storage means in time sequence with the previously stored words of each signal for opening said second loop to prevent passage of the oldest stored words therethrough.

6. The system of claim 5 wherein said storage means is a delay line.

7. The system of claim 5 wherein said storage means is a series of shift stages.

8. The system of claim 1 further comprising means for converting the sampled amplitudes to binary words, said means for storing comprises a magnetic core memory system having a multiplicity of storage addresses for said words and the sampled and converted amplitudes of each signal are serially stored at said addresses.

9. The system of claim 8 further including control means for addressing each of said addresses and means responsive to addressing of an address at the oldest of a stored amplitude of one signal for sampling the occurring amplitude of another signal.

10. A system for simultaneously displaying representations of the amplitude of two signals which have occurred simultaneously comprising, a display means having a sweep means for displaying a representation of the amplitudes of the signals over a predetermined interval of time, means for periodically sampling the amplitude of each signal, storage means including a recirculating loop for storing a predetermined number of sampled amplitudes of each signal, means for applying the sampled amplitudes of the two signals alternately to said storage means in the time sequences as sampled, control means for applying alternate stored amplitudes in time sequence as sampled to said display means during a cycle of recirculation of the stored amplitudes in said loop, and means for eliminating the oldest stored amplitude of each signal from said storage means after said stored amplitudes have been recirculated a predetermined number of times and inserting newly sampled amplitudes for each signal in said loop in time sequence with the previously newest stored amplitudes.

11. The system of claim 10 wherein, said display means comprises a cathode ray tube having a vertical deflection means, and means for biasing said vertical deflection means in accordance with the signal representation to be displayed during a recirculation cycle so that one signal representation is displayed in spaced relation to the other.

12. The system of claim 10 further comprising means for converting each sampled amplitude into a binary word, said recirculating loop including first and second loops, the words normally recirculating through said first loop, second storage means in said second loop for storing newly sampled and converted words, and said means for eliminating comprises means responsive to a predetermined number of recirculation cycles of words through said first loop for routing the words through said second loop and inserting the words in the second storage means in time sequence with the previously stored words and opening said second loop to prevent passage of the two oldest stored words therethrough.

13. The system of claim 10 wherein said storage means is a delay line.

14. The system of claim 10 wherein said storage means is a series of shift registers.

* * * * *